United States Patent [19]

Holladay

[11] 4,245,686

[45] Jan. 20, 1981

[54] TIRE CHANGING APPARATUS

[75] Inventor: Jimmie L. Holladay, Antioch, Tenn.

[73] Assignee: Hennessy Industries, Inc., Elk Grove Village, Ill.

[21] Appl. No.: 958,000

[22] Filed: Nov. 6, 1978

Related U.S. Application Data

[63] Continuation of Ser. No. 478,040, Jun. 10, 1974, abandoned, which is a continuation-in-part of Ser. No. 373,491, Jun. 25, 1973, abandoned.

[51] Int. Cl.² ............................................. B60C 25/06
[52] U.S. Cl. ............................................. 157/1.1
[58] Field of Search ............................ 157/1, 1.1

[56] References Cited

U.S. PATENT DOCUMENTS

| | | | |
|---|---|---|---|
| 3,786,852 | 1/1974 | Houston | 157/1.1 |
| 3,805,871 | 4/1974 | Corless | 157/1.1 |
| 3,937,264 | 2/1976 | Mikovits et al. | 157/1.1 |

Primary Examiner—James G. Smith
Attorney, Agent, or Firm—Wegner, Stellman, McCord, Wiles & Wood

[57] ABSTRACT

An improved tire bead seating apparatus for use with tire changers. The tire changer serves as a support structure for tire bead seating apparatus which includes at least one nozzle having an outlet end adapted to be directed at the interface of a tire bead and wheel rim. The nozzle has an internal passage terminating at the outlet end which internal passage has a straight line length extending from the outlet end of at least ¼ inch. The internal passage in the nozzle also has a substantially uniform cross section over the straight line length thereof. One embodiment of the invention shows the use of the improved bead seating apparatus in a tire changing stand of the type having a rotatable rim receiving table while another embodiment illustrates the tire bead seating apparatus in connection with a tire changing apparatus having a stationary table.

6 Claims, 8 Drawing Figures

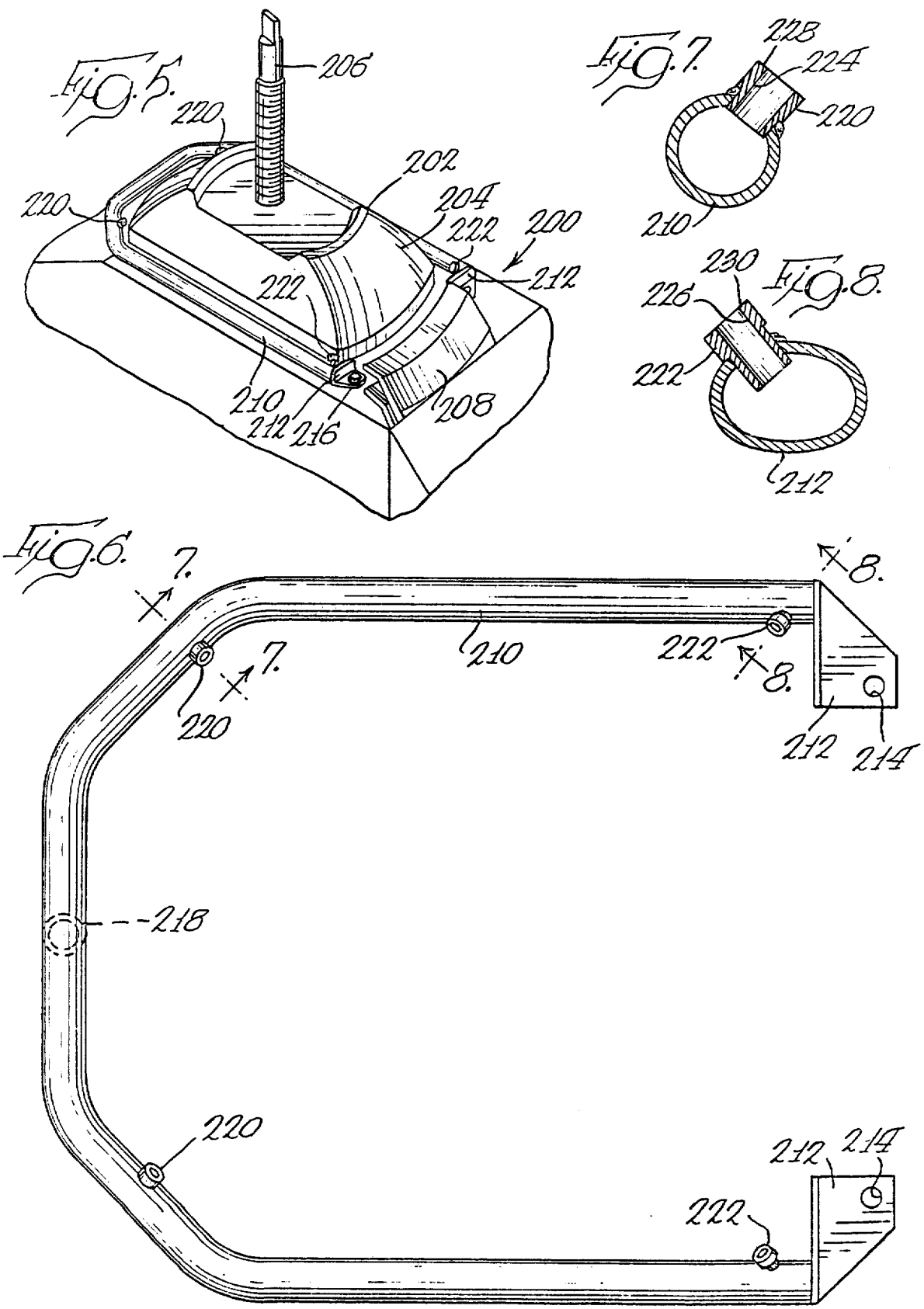

TIRE CHANGING APPARATUS

CROSS-REFERENCE

This is a continuation, of application Ser. No. 478,040 filed June 10, 1974, now abandoned which in turn is a continuation in part of application Ser. No. 373,491, filed June 25, 1973, now abandoned.

BACKGROUND OF THE INVENTION

This invention relates to tire servicing equipment, and, more specifically to bead seating apparatus for use with tire changers.

One difficulty encountered in tire changing apparatus today is in such apparatus equipped with tire bead seating apparatus. Typically, the rim receiving table of such apparatus is provided with a plurality of apertures out of which small jets of air may be directed toward the interface of a wheel rim having a tire received thereon. Some of the air enters the interior of the tire through the interface causing a pressure differential which, in turn, causes the tire to expand to seat the bead.

The difficulty with such apparatus is that the many jets, frequently on the order of twenty or more in number, generate very turbulent streams of air which diffuse rapidly so that air is directed to the interior of the tire very inefficiently. This, in turn, has caused such systems to be limited to locations where air under very high pressures, frequently 150 psig or more, is available. Even when such high pressure air is employed, reliable seating of the bead on various so-called "difficult" tire and rim combinations cannot be achieved.

SUMMARY OF THE INVENTION

A principal object of the invention is to provide a new and improved bead seating apparatus for use with tire changing equipment.

DESCRIPTION OF THE DRAWINGS

FIG. 5 is a somewhat schematic, perspective view of a conventional tire changing stand equipped with tire bead seating apparatus made according to the invention;

FIG. 6 is a plan view of the bead seating apparatus;

FIG. 7 is a vertical section taken approximately along the line 7—7 of FIG. 6; and FIG. 8 is a vertical section taken approximately along the line 8—8 of FIG. 6.

DESCRIPTION OF THE PREFERRED EMBODIMENTS

Figure 1:
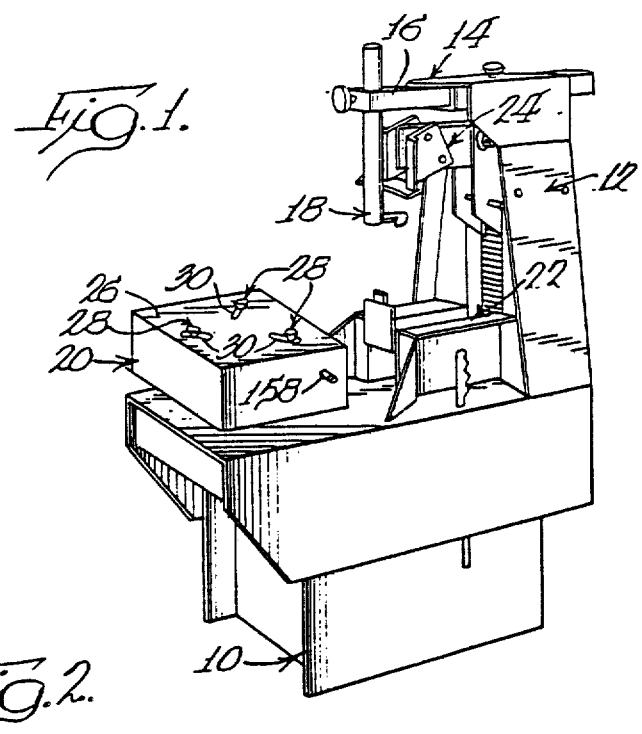
FIG. 1 is a perspective view of a tire changing apparatus made according to the invention.

With reference to FIG. 1, a tire changing apparatus embodying the invention is seen to include a base, generally designated 10, having an upstanding column, generally designated 12, at one side thereof. The upper end of the column 12 includes adjustable means, generally designated 14, including an arm 16 by which a tire changing tool, generally designated 18, may be moved toward and away from a rotatable rim-gripping table, generally designated 20. As is well known, means are also provided whereby the vertical position of the tool 18 can be adjusted.

Intermediate the rotatable table 20 is a rim receiving surface, generally designated 22, which is aligned with an upper bead breaker assembly, generally designated 24, which may be employed to break the bead of a tire resting on the surface 22. A lower bead breaking assembly (not shown) may be provided if desired. In general, the arrangement is along the lines of the previously identified Strang et al patent.

The table 20 includes a planar upper surface 26 and upstanding therefrom and movable relative thereto are equally radially spaced rim engaging elements, generally designated 28. In the preferred embodiment, at least three of the elements 28 are provided and each is movable toward and away from the center of the table 20 in arcuate slots 30. Thus, a rim substantially centrally located on the table 20 may have its lower flange engaged by the elements 28 when they are moved inwardly toward the center of the table 20.

Figure 2:
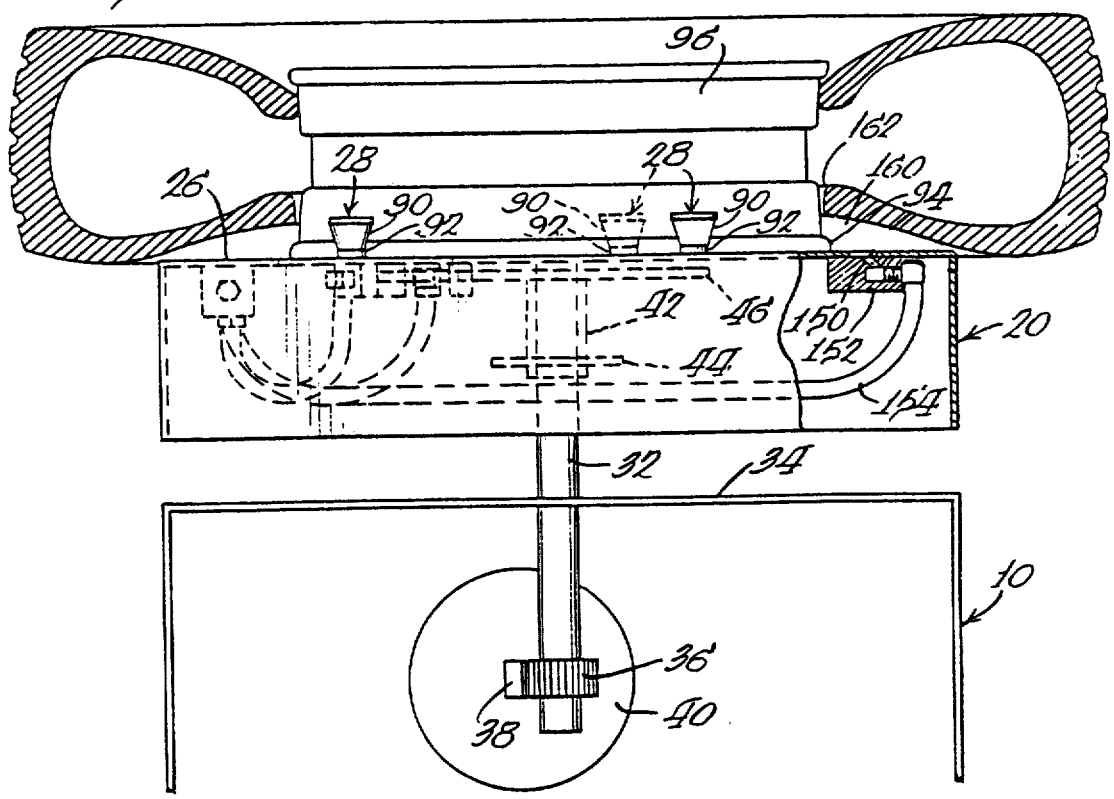
FIG. 2 is a vertical section of a rotatable, rim-gripping table.
Figure 3:
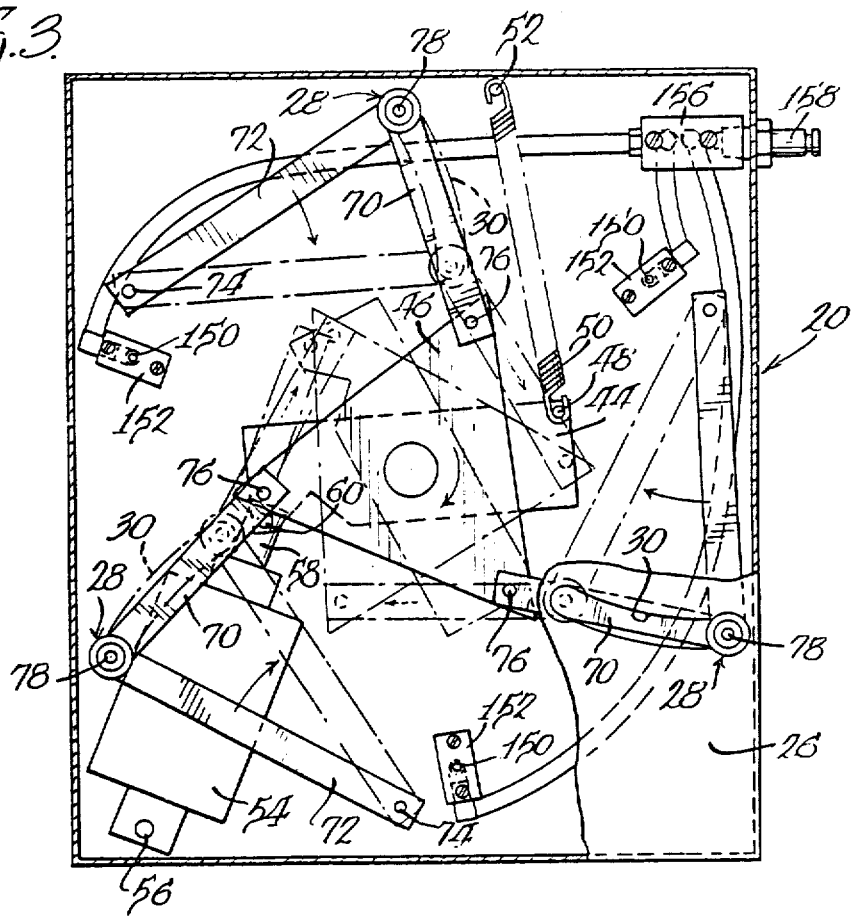
FIG. 3 is a somewhat schematic horizontal section of the table.

Referring now to FIGS. 2 and 3, the table 20, in addition to having the planar upper surface 26, also includes a depending peripheral skirt 32 which serves to house various components. The table 20 is mounted on the upper end of a rotatable shaft 32 which extends through an opening (not shown) in the upper surface 34 of the base 10. Suitable bearings, not shown, mount the lower end of shaft 32 for rotation so that the table 20 may be rotated therewith.

Near the lower end of the shaft 32 and within the base 10, the shaft 32 mounts a spur gear 36 which is engaged by a rack 38 which, in turn, is reciprocated by a cylinder 40 to be described in greater detail hereinafter. Suitable mounting means for the cylinder 40 and suitable guide means for the rack 38, neither of which are shown, are provided.

Below the planar surface 26 and within the housing defined by the skirt 30, the upper end of the shaft 32 rotatably receives a sleeve 42 having a rectangular plate 44 secured thereto near its lower end and a triangular plate 46 is secured thereto near its upper end. As best seen in FIG. 3, one corner of the rectangular plate 44 includes a pin 48 for securing one end of a spring 50 thereto. The opposite end of the spring 50 is secured as by a pin 52 to a portion of the table.

Within the housing defined by the skirt 30 is an air cylinder 54 having its casing pivotally secured as by a pin 56 to the table and having an extendable rod 58 secured by a pivot pin 60 to the corner of the rectangular plate 44 opposite the pin 48. As a result, extension or retraction of the rod 56 rotates the plate 44 and thus both the sleeve 42 and the plate 46 about a vertical axis defined by the center of the shaft 32.

As generally alluded to previously, each of the three rim engaging members 28 are mounted for movement within arcuate slots 30 in the planar surface 28 of the table. The arrangement is such that the path of movement is directed towards the rotational axis of the table. Mounting means for this purpose include, for each of the rim engaging members 28, first and second links 70 and 72. One end of the link 72 is pivotally connected by a pin 74 to the table, while the opposite end of the link 70 is pivotally connected as by a pin 76 to a corresponding corner of the triangular plate 46. The other ends of the links 70 and 72 are pivotally connected as by pins 78 to each other. The pins 78 are furthered such as to extend upwardly through the slot 30 to journal the rim engaging members 28.

Returning now to FIG. 2, each of the rim engaging members 28 is seen to include a flared surface facing the center of the table 20, which flared surface is defined by an inverted frusto cone 90. The lower end of each frusto cone terminates in a cylindrical portion 92 which extends through the corresponding slot 30.

As a result of the foregoing description, it will be recognized that the flared surface defined by each frusto cone 90 will bear against the flange 94 of a rim 96 when the latter is mounted on the table and initially make point contact therewith. It will also be recognized that the links 70 and 72 will deflect somewhat under loading and that factor, coupled with the cylindrical lower ends 92 of the rim engaging members 28, causes the latter to be mounted for limited movement in a direction transverse to the planar surface 28 of the table 20. Thus, when the cylinder 54 is actuated to move the rim engaging members 28 toward the center of the table to engage a rim, initially, the latter will ride up on the rim flange 94 and drawn thereagainst will then move downwardly an almost imperceptible distance and tip such that their upper ends are located somewhat outwardly relative to the bottom ends thereof. This results in a vertical force being applied to the upper surface of the rim flange 90 to draw the same downwardly and tightly against the planar surface 26 of the table to frictionally lock the rim against the table. In other words, the locking force precluding relative rotation between the table 20 and the rim 96 is established by friction between the rim and the table as opposed to the rim engaging members 28 acting radially on the rim.

It has been determined that such force is sufficient such that no roughing of the surface of the rim engaging members 28 need be provided and, as is apparent, since the same are in effect rollers pivotally received from the pin 78, the holding action is due to the friction engagement of the rim with the table top. Thus, the rim engaging elements 28 will not mar the periphery of a rim received on the table.

Figure 4:
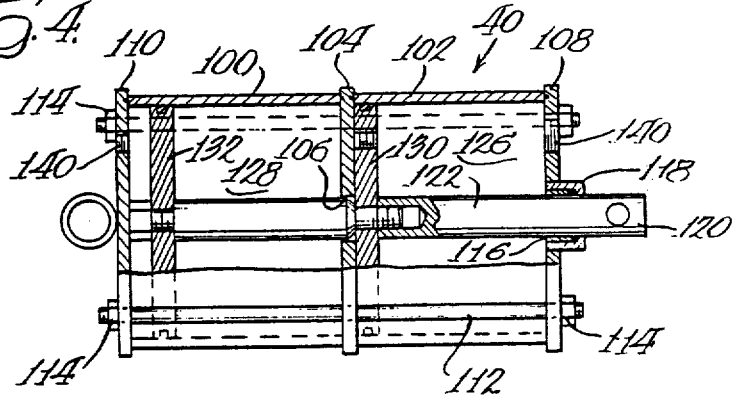
FIG. 4 is a side elevation of a cylinder having an interal dash-pot used to drive the table with parts shown in section for clarity.

Turning now to FIG. 4, the cylinder 40 will be described in greater detail. Basically, the same is comprised of a hollow cylindrical sleeve defined by a sleeve 100 and a sleeve 102. Interposed between the two sleeves 100 and 102 is a central plate 104 having a central aperture 106. End plates 108 and 110 are provided at the ends of the sleeves 100 and 102 and are held in place by retaining rods 112 and nuts 114 located exterior of the sleeves 100 and 102 as is well known in the art.

The end plate 108 includes an opening 116 surrounded by a seal 118 through which an end 120 of a piston rod 122 emerges for connection to the rack 38 as seen in FIG. 2. The rod 122 also extends through the opening 106 in the central plate 104 and the end plate 108 and into a chamber 128 defined by the central plate 104 and the end plate 100.

Within each of the chambers 126 and 128 is an associated piston 130 and 132, respectively. Both of the pistons 130 and 132 are connected to the rod 122 for movement therewith. In addition, each of the end plates 108 and 110 is provided with a port 140 so that fluid under pressure, normally air, could be directed against either the piston 130 or the piston 132 at the right and left hand sides of the two respectively.

In the preferred embodiment, the opening 106 and the central plate 104 is slightly larger than the rod 122. For example, the opening 106 may be circular and have a radius approximately 0.010 inches greater than the radius of the rod 22 if the latter is cylindrical. As a result, a small space is formed.

A body of fluid, such as hydraulic oil, is located between the pistons 130 and 132. Thus, when fluid under pressure is applied to the left side of the piston 132 to cause the same to move to the right, as viewed in FIG. 4, the body of fluid, which will initially be entirely within the chamber 128, will be forced through the small space between the opening 106 and the rod 122 to the right-hand side of the central plate 104. The smallness of the opening provides a restriction to such fluid flow such that an internal dashpot is defined to control the rate of movement of the rod 122. When both of the pistons 130 and 132 have been fully moved to the right, the application fluid under pressure through the port 140, will cause the reverse action, again restricting movement.

It will be recognized that the use of a cylinder such as illustrated in FIG. 4, provides ideal movement rate control in a single structure. Moreover, the use of a doubleacting cylinder for rotating the table 20 allows the same to be rotated in one direction to an extreme position whereupon one bead of a tire may be completely mounted or demounted. The table may then remain in that position of movement until the operator is prepared to mount or demount the other bead of the tire and then returned to the initial position or opposite extreme of movement.

As a result, no time is wasted, as would be the case with a conventional spring return for the table.

To maximize the efficiency of the tire changing apparatus, an improved tire bead seating apparatus made according to the invention is embodied in the table 20. In particular, at equally radially spaced positions, the planar surface 26 is provided with openings 150 below which are mounted air-directing nozzles 152. Each of the nozzles 152 includes a hose connection 154 to a fitting 156 within the table (see FIG. 3) which has a connection to an exterior quick-disconnect coupling 158. When air under pressure is directed to the coupling 158, the air will emerge from the nozzles 152 through the openings 150 at three locations in streams designated 160 in FIG. 2 to be directed at the interface of the lower bead 162 of a tire and the rim 96 on the table. Such air streams efficiently seat the bead on the tire even though, in contrast to conventional practice, far less than a substantially continuous ring of air is generated.

The reliable bead seating achieved with the invention is accomplished through the use of certain specific and generally critical parameters in the fabrication of the bead seating apparatus.

In conventional systems of the type generally alluded to previously wherein numerous apertures in a table top or in a pipe-like manifold are provided, frequently numbering twenty or more, the apertures from which the jets of air emanate are very small in diameter compared to those employed in the nozzles 152 herein. Moreover, since they are generally merely punched holes in the pipe or the table top, the linear length of the same is very short, being no more than the thickness of the material of which the table top is formed or the thickness of the pipe. This linear length will generally be no more than approximately 1/10 inch.

As a result of the foregoing conventional construction, air jets emanating from the apertues in such structures are quite turbulent in nature. Since such streams must traverse the distance from the outlet end of such apertures to the interface of a wheel rim and a tire bead, and are so turbulent, they diffuse rapidly with the result that a great deal of air emanating from such jets is not delivered to the interior of the tire. As a result, to be operative at all, the conventional systems have required very high pressures in the source of air in order to move the air rapidly to the rim-bead interface, such pressures normally ranging from 150 psig upwardly. Even with such high pressures, reliable bead seating cannot be obtained with such structures without the presence of a so-called "air dam" effect provided by such structures wherein substantially the entire periphery of a wheel rim-tire bead interface is covered by air emanating from a large number of jets.

More specifically, the air dam is in effect a gross seal directed by a substantially continuous ring of air being directed from the apertures towards the interface. Such air as is transmitted to the interior of the tire to cause the pressure differential necessary for bead seating is prevented from escaping in degrees sufficient to cause the device to be inoperable by the obstacle to its escape presented by the continuing curtain of air directed at the interface.

Applicant has determined that the beads of tubeless tires can be more reliably seated by foresaking the air dam effect and delivering a far lesser number of highly directionalized streams of air to the interface. For example, in a structure employing three of the nozzles 152 as described above, when a fourteen inch rim is placed on the table 20, at the point where the streams of air impinge upon the rim-bead interface, they have only diverged to a width on the order of 1¼ to 2 inches. Thus, only 10-14% of the total periphery of the rim-bead interface has air impinging upon it.

This effect is achieved by structuring the bead seating apparatus such that the turbulence of the air streams emanating from the nozzles is vastly reduced over that in prior art structures to more closely approximate a laminar flow condition of the air streams although it is not clear whether the air streams are, in actuality, in a laminar condition. In terms of structure, it has been determined that the air streams can be made highly directional through the use of nozzles having outlet ends 170 (FIG. 2) which are immediately preceded by an internal passage 172 with a straight line extent of at least ¼ inch. That is, the passage 172 is straight from the outlet end 170 to the interior of the nozzle for a distance of at least ¼ inch. Moreover, it is highly desirable that the cross-sectional area of the internal passage 172 be uniform over such straight line extent.

It is also highly preferred that the straight line extent be at least ⅜ inch in length and in a tire changing apparatus such as illustrated in FIG. 1-4, inclusive, the straight line extent of the passage 172 is chosen to be 7/16 inch.

Still a further consideration is that the sum of the cross-sectional areas of the straight line extents of each of the nozzles be equal to the cross-sectional area of the air supply source such as the female portion (not shown) of the quick-disconnect fitting 158 (FIG. 3). Similarly, it is highly desirable that the air conveying cross-sectional area of the fitting 156 at least be equal to the cross-sectional area of the supply and that the sum of the cross-sectional areas of the interiors of the conduits 154 at least be equal to the cross-sectional area of the supply.

Thus, nozzle cross-sectional area over the straight line portion thereof is in effect determined by the cross-sectional area of the supply and the number of nozzles employed.

The cross-sectional shape of the internal passage 172 may take on any desired form. However, since an object is to highly directionalize the emanating air stream, configurations tending to cause turbulence generally should be avoided. For this reason, and for the further reason that the cost of fabrication is always a significant factor, generally the cross-sectional shape of the passages 172 will be circular, with the result that over the straight line length of the passage 172, the same will be cylindrical.

The relationship of the cross-sectional areas with respect to the supply line is desirable in terms that the cross-sectional area at any point in the system be not less than the cross-sectional area of the supply line for the reason that constriction would reduce the capability of the system to deliver the entire volume of air available at the supply line to the rim-bead interface. Thus, the cross-sectional area of the system can exceed, at some points, the cross-sectional area of the supply. However, it is preferred that the sum of the cross-sectional areas of the nozzles not exceed the cross-sectional area of supply for the reason that velocity of the emanating stream would be reduced, thereby possibly allowing the streams to diverge a greater distance in their travel to the rim-bead interface with a greater opportunity for diffusion of the air stream, with the result that a lesser volume of air would be delivered to the interior of the tire to decrease the speed of the bead seating operation and/or the reliability thereof.

A further embodiment of a tire bead seating apparatus made according to the invention is illustrated in FIGS. 5-8, inclusive, in connection with a tire changing apparatus of the type having a stationary table. The stand is generally designated 200 and may be of the type described in greater detail in the commonly assigned Strang et al U.S. Pat. No. 3,255,800. The stand 200 includes a rim-receiving table 202 having rim-receiving surfaces 204 which are portions of a frusto cone the center of which is coincident with a conventional center post 206 upon which a rim may be impaled. The stand 200 also includes a lower bead breaking assembly 208.

The tire bead seating apparatus of the invention includes a horseshoe-shaped tube 210 having brackets 212 affixed to the ends of the legs thereof. Each of the brackets 212 includes an opening 214 for receipt of bolts 216 by which the apparatus may be secured to the stand 200. The bight of the tube 210 is located on the stand oppositely of the bead breaker 200 and includes a downwardly directed nipple 218 which may be connected through suitable valving to a source of air under pressure to establish fluid communication between such source and the interior of the tube 210. The nipple 218 preferably has an interior cross-sectional area equal to that of the tube 210 and equal to that of the source which typically will be a hose or the like, extending through valving from a surge tank associated with a compressor.

At the points illustrated in FIG. 2, the tube 210 mounts two pairs of nozzles. The nozzles of one pair are designated 220, while the nozzles of the second pair are designated 222. The nozzles 220 and 222 are located on the tube 210 in such a way as to be generally located on radii extending from the center post 206 when assembled on the stand 200. Moreover, they are located thereon so as to be angled upwardly when on the stand at an angle approximately equal to the upward angle of the frusto-conical surfaces 204. That is, the arrangement is generally such that the air streams emanating from the nozzles 220 and 222 would parallel the underlying surfaces 204 if the same were extended.

The nozzles 220 have interior passages 224, while the nozzles 222 have interior passages 226. The internal passages 224 terminate at an outlet end 228, while the interior passages 226 terminate at outlet ends 230. In each case, as with the case of the nozzles 152, the interior passages 224 and 226 have a straight line section terminating at their respective outlet ends which has a length of at least ¼ inch and, preferably, ⅜ inch or more. In a highly preferred embodiment of the invention, the straight line length of the interior passage of the nozzles 220 is approximately ½ inch, while in the case of the nozzles 222, the corresponding dimension is approximately ⅝ inch.

The principal reason for the difference in such length is the fact, as will be apparent from FIG. 2, the outlet ends of the nozzles 220 are closer to the center post 206 than are the outlet ends of the nozzles 222. Consequently, the outlet ends of the nozzles 222 will be further from the rim-bead interface of a tire and rim received on the stand about the center post 206 than the outlet ends of the nozzles 220. The increased length provides for greater directionality of the air streams emanating from the nozzles 222 to compensate for the increased distance factor.

Again, the sum of the cross-sectional areas of the internal passages of the nozzles 220 and 222 is chosen to equal the cross-sectional area of the interior of the supply line for the reasons alluded to previously in connection with the description of the embodiment illustrated in FIGS. 1-4.

From the foregoing, it will be appreciated that tire bead seating apparatus made according to the invention provide highly directionalized streams that are few in number for rapidly and efficiently seating the beads on tubeless tires. It has been determined that through the use of the principles of this invention, that the pressure requirements of air supply system used in conjunction with the invention are considerably diminished. For example, a system made according to the invention can be operated with efficiency and reliability equal to that of present commercial systems with a 30–35% decrease in pressure at the source of air. As a result, the tire bead seating apparatus made according to the invention is susceptible to far greater use in that it can be used at locations whereat the air source is not capable of providing pressures required to run present-day commercially available equipment. Moreover, it will be appreciated that the invention can be more economically fabricated than present-day systems in that tube forming and hole punching operations are minimized, there being no need to provide numerous apertures nor formed circular tubes.

I claim:

1. Tire bead seating apparatus comprising: at least one, and no more than a relatively few, nozzle(s) having an outlet end adapted to be directed at the interface of a tire bead and wheel rim, said nozzle(s) further having a linear, internal passage terminating at said outlet end and having a straight line length extending from said outlet of at least ¼ inch; said internal passage over said straight line length having a substantially uniform cross section said nozzle(s) providing a highly directionalized fluid stream(s); means for supplying air under pressure to said internal passage; and means supporting said nozzle(s) and orienting the same in sufficiently close proximity to a tire on a wheel such that said highly directionalized stream(s) will impinge upon a tire bead and wheel surface without appreciably diverging and as a discrete stream(s).

2. Tire bead seating apparatus comprising: a support structure for engagement in a predetermined relation with a wheel having a tire loosely received on the wheel; air conduit means; and a plurality of a relatively few nozzles mounted on said support structure at widely spaced locations thereon and connected to said conduit means, each said nozzle having an outlet end directed at the interface of a wheel and the bead of a tire on the wheel when said wheel is engaged with said support structure in said predetermined relation for directing air under pressure toward said interface, each said nozzle having an interior passage having a linear extent terminating at said outlet end, said linear extents being at least ¼ inch, the cross section of the internal passage of each nozzle over said linear extents being substantially uniform, said nozzles generating highly directionalized air streams from air received from said conduit means, the spacing between said nozzles and the location of said outlet ends with respect to said support structure when in said predetermined relation with a wheel having a tire loosely received thereon being such that a discrete air stream will emanate from the associated outlet end and be directed towards said interface without substantial spreading over the distance from each said outlet end to said interface and without appreciably diverging to interact with streams of air emanating from adjacent nozzles.

3. Apparatus according to claim 2 wherein the linear extent of each said internal passage of each said nozzle is at least ⅜ of an inch.

4. Apparatus according to claim 2 wherein said support structure includes means for receiving a wheel rim with a tire thereon and for locating the wheel rim with respect to said nozzles such that air discharged from said outlet ends will be directed toward said interface of the tire bead and the wheel rim.

5. Tire bead seating apparatus according to claim 2 wherein there are no more than about four of said nozzles.

6. Tire bead seating apparatus according to claim 2 wherein said conduit means is adapted to be connected to a source of air under pressure and has a given air passage area; the sum of the cross sectional area of the linear extents of said nozzles being substantially no less than the cross sectional area of said conduit means to deliver the entire volume of air available from said source through said given air passage area.

* * * * *